United States Patent [19]

Wilhite

[11] Patent Number: 5,054,840
[45] Date of Patent: Oct. 8, 1991

[54] METHOD AND APPARATUS FOR COVERING OPEN TRUCK BEDS

[76] Inventor: Dennis Wilhite, 18261 Bowman Rd., Cottonwood, Calif. 96022

[21] Appl. No.: 586,405

[22] Filed: Sep. 21, 1990

[51] Int. Cl.$^5$ .............................................. B60P 7/04
[52] U.S. Cl. ...................................... 296/98; 160/265
[58] Field of Search ................ 296/98, 100; 160/23.1, 160/26, 238, 265

[56] References Cited

U.S. PATENT DOCUMENTS

| | | | |
|---|---|---|---|
| 3,977,719 | 8/1976 | Thurston | 296/98 |
| 4,380,350 | 4/1983 | Block | 296/98 |
| 4,691,957 | 9/1987 | Ellingson | 296/98 |

FOREIGN PATENT DOCUMENTS 693979  7/1953  United Kingdom ................. 296/98

Primary Examiner—Robert R. Song
Attorney, Agent, or Firm—Herbert C. Schulze

[57] ABSTRACT

A method and apparatus for covering open truck beds so as to prevent material being carried in the bed from flying out during transport including the equipping of a truck with a specially designed roll up tarpaulin, engaging the rolled up tarpaulin with a specially designed telescoping hook arrangement, pulling the tarpaulin on its rolled up position by guide members resting upon the edge of the sides of the truck bed, and fastening said tarpaulin to the end of the truck bed in such manner that it drapes within the sides of the truck bed so as to completely prevent inadvertent discharge of material.

2 Claims, 4 Drawing Sheets

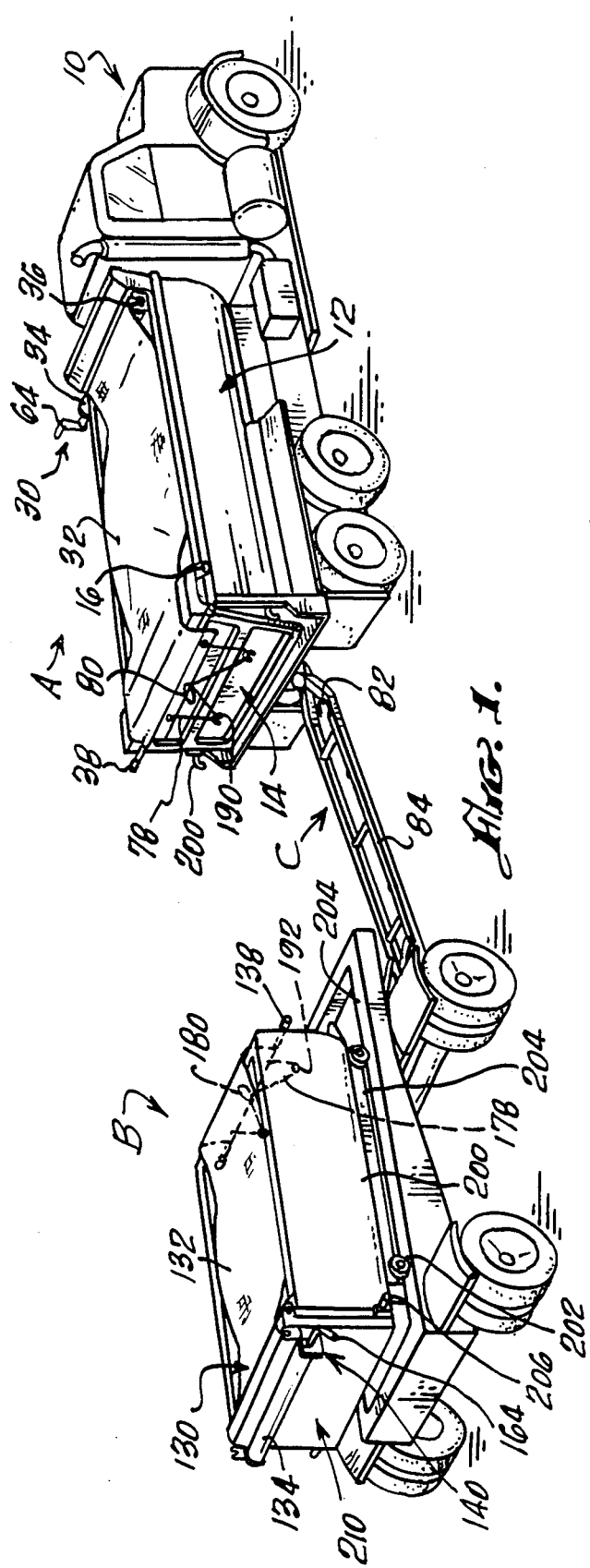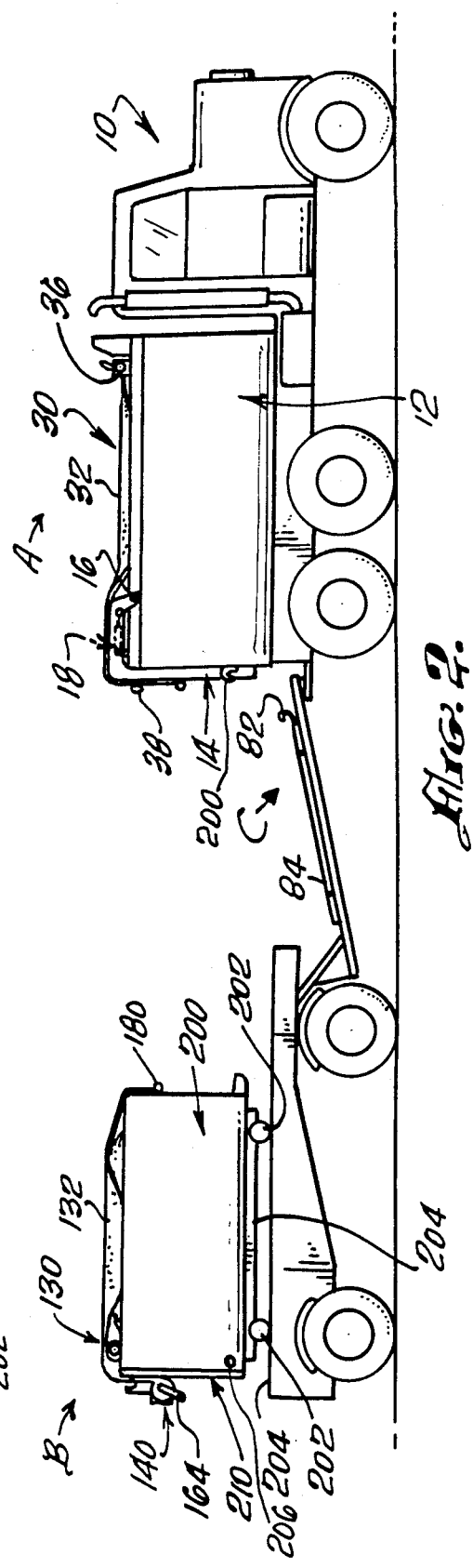

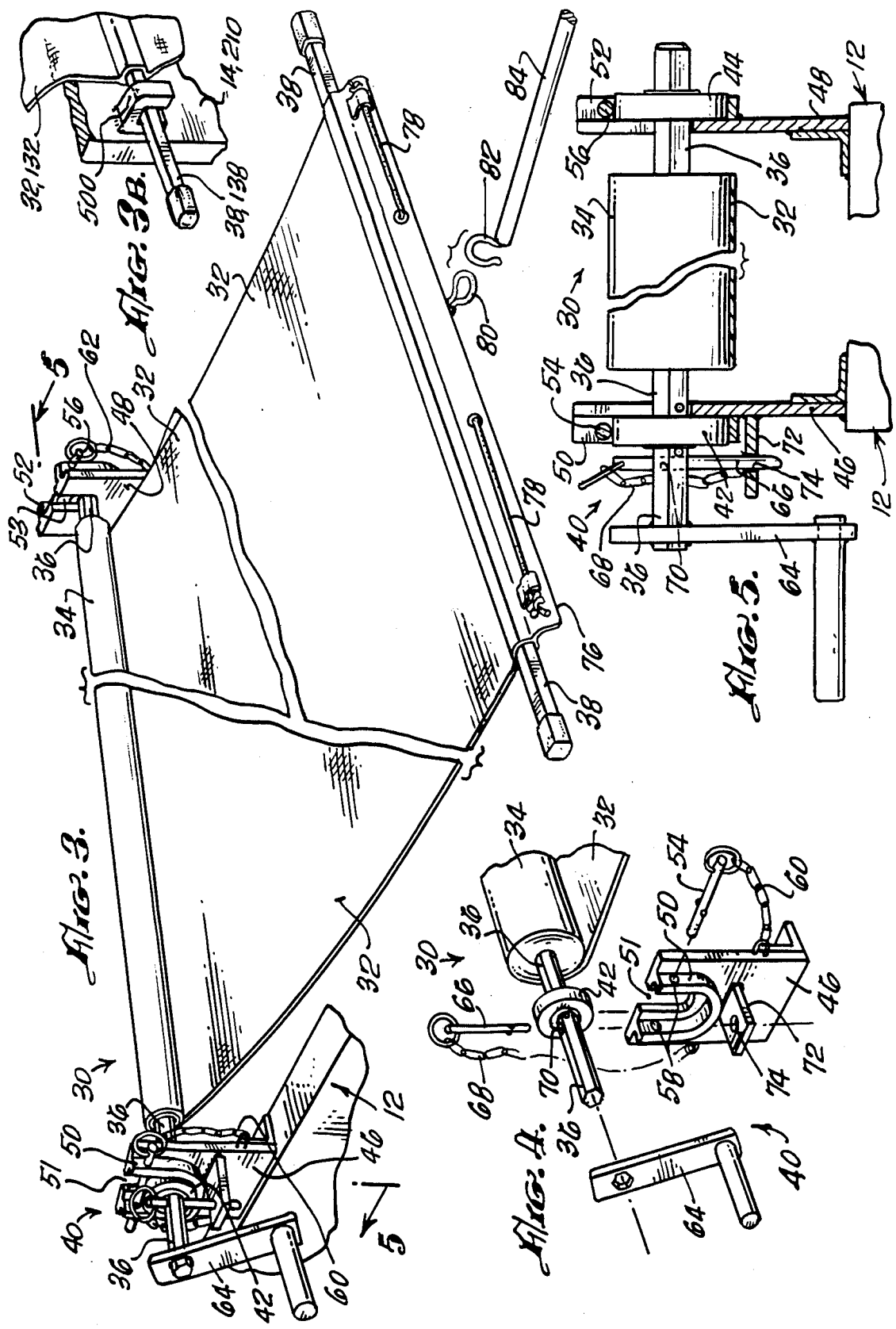

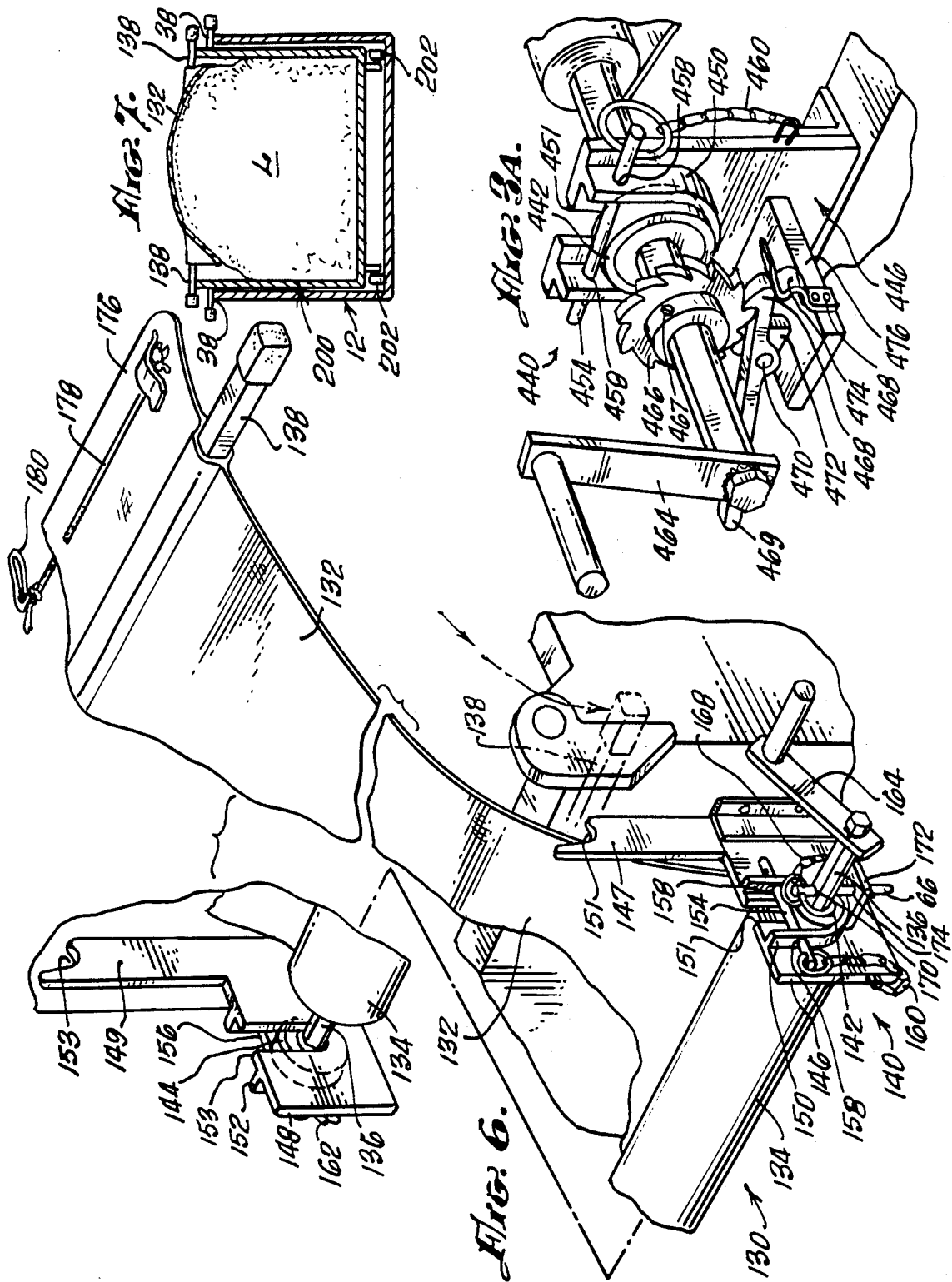

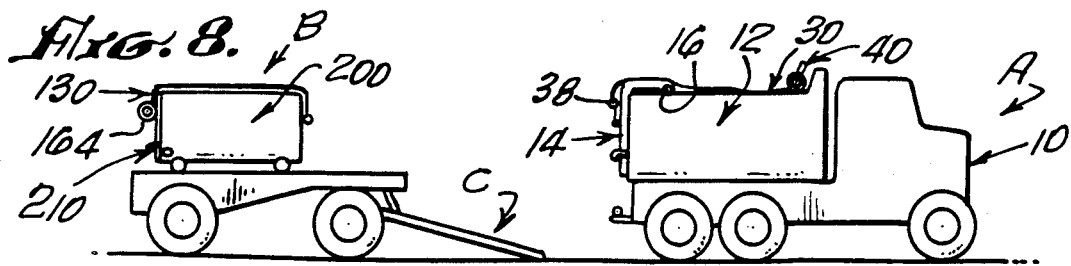
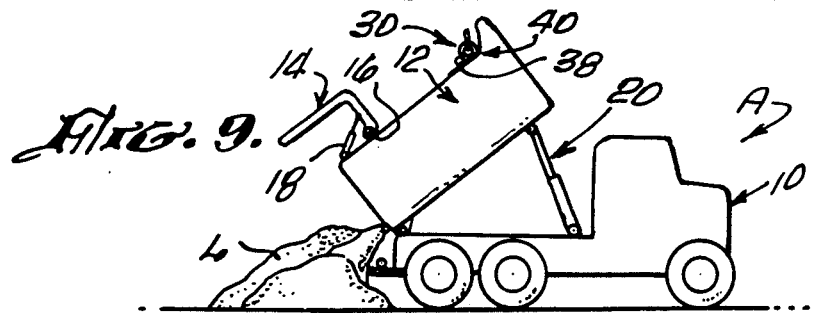
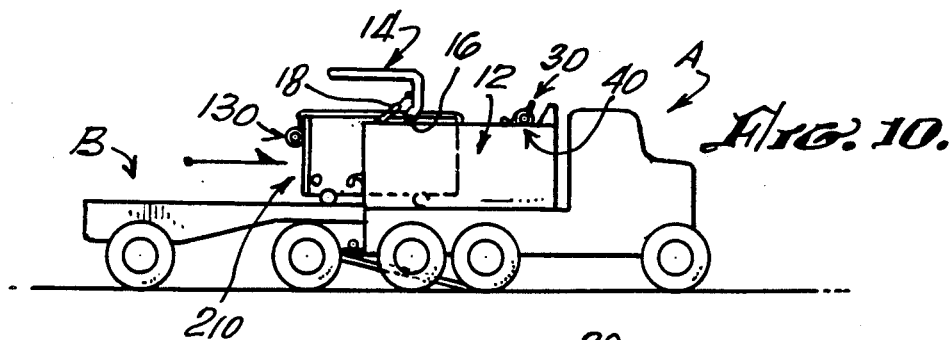
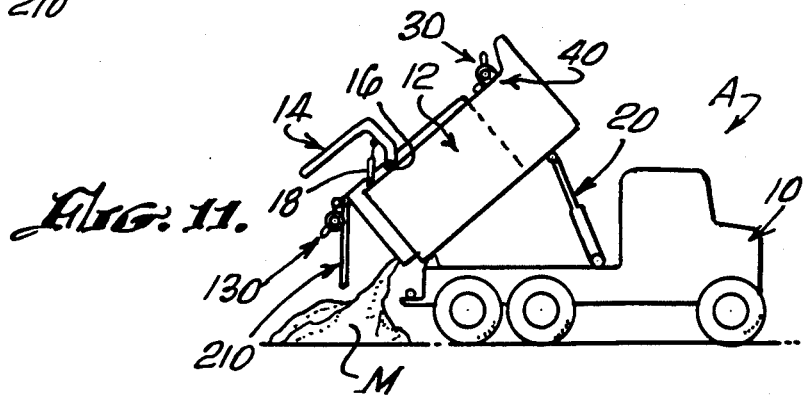
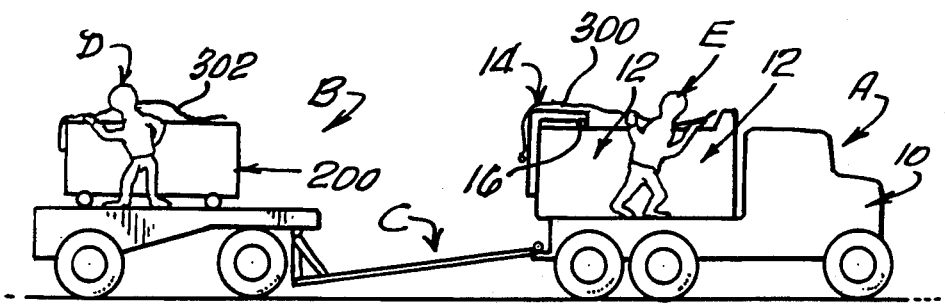
PRIOR ART

METHOD AND APPARATUS FOR COVERING OPEN TRUCK BEDS

CROSS REFERENCE TO RELATED PATENT APPLICATIONS

There are no patent applications filed by me related to the within application.

BACKGROUND OF THE INVENTION

I. Field of the Invention

This invention is in the general field of automotive trucks and trailers and the like. The invention is even more particularly directed to methods and apparatus for preventing undesired discharge of material from a truck bed while in transport. The invention is even more particularly directed to a tarpaulin specially mounted on a rollup mechanism in such manner that it drapes within the sides of the truck bed to prevent discharge of material therefrom and is even more particularly directed towards such a tarpaulin in combination with a specially designed hook and extension pole for affixing the tarpaulin in place.

II. Description of the Prior Art

Trucks with open beds have been covered in the past by means of boards, tarpaulins which are unfolded and held in place by stakes, weights, or the like.

I know of no prior art of a tarpaulin which may be applied by one person without the necessity of climbing into or upon the truck bed or upon the load in the truck bed which requires no tie downs or other devices on its sides. Thus there is no prior art known to me related to the invention as described herein.

SUMMARY OF THE INVENTION

Trucks and trailers with open beds are used extensively for transporting materials such as produce, gravel, asphaltic road materials, dirt, and the like.

Such open bed trucks and trailers have a particular fault in that during operation upon highways material will be blown out by wind or will bounce out because of uneven roadway conditions and the like. When this occurs it is both annoying and dangerous to other vehicles following the truck or trailer from which material is being discharged. Many broken windshields and even accidents have occurred as a result of such condition.

Because of the problem of material discharging from open bed trucks and trailers during transport, there are numerous laws requiring covering of such loads in a manner to prevent discharge.

In general, covers over loads in open trucks and trailers will be by the use of boards or the like, or by the use of tarpaulins.

When tarpaulins are used they are generally stored prior to use by being folded and being placed within the truck cab or within a special storage compartment or the like. When such tarpaulins are desired to be used they must be unfolded and laid out on the load in a truck bed. This requires considerable time and energy, frequently under very adverse conditions such as in extreme heat or cold. Additionally a great deal of physical labor is required to properly cover the tarpaulin over the load and to fasten it down in such manner that it, itself, will not be blown off during transport and so that it will satisfactorily shield the load in the truck bed from escaping during transport.

On some occasions efforts have been made to roll a tarpaulin and unroll it from one end of a truck to another. This does not work well, however, since it still requires entering into the truck bed on top of the load and carefully unrolling and then fastening the tarpaulin down about the truck bed or putting weights (usually rocks or the like) on the tarpaulin to hold it in place.

I have now conceived and developed an extremely effective method and apparatus for covering loads in open bed trucks and trailers and the like. The manner in which I have accomplished this is to provide a very effective and simple roll up mechanism which can be fastened to one end of an open truck or trailer bed and which holds a tarpaulin in a roll up position on one end of the open bed. I have combined with this an extension rail fastened into the end of the tarpaulin in such manner that the tarpaulin will be pulled along that end without the end dropping into the load. I have further combined this with a telescoping pole with an appropriate hook means attached to the tarpaulin to pull the tarpaulin along the length of the truck bed in such manner that the tarpaulin itself drapes inside the sides of the open bed. I have further combined this with means to quickly and easily fasten the tarpaulin in place once it has been pulled over the full length of the trailer or truck bed.

Utilizing my method and apparatus it is possible to completely cover a load in an open bed truck in 3 minutes and with very little physical exertion. Any other method of covering a load with a tarpaulin or with boards, or the like requires at least approximately 15 minutes or more and a great deal of physical exertion and walking upon the load itself within the truck or trailer.

It is an object of this invention to provide a means for easy covering of a load in an open bed truck or trailer by use of a roll up tarpaulin;

It is another object of this invention to provide a roll up tarpaulin wherein it may be dragged across a load in an open bed truck or trailer resting upon an extension along the sides of the truck or trailer;

Another object of this invention is to provide such a method and apparatus which can be easily mounted and dismounted on the end of a truck or trailer;

Another object of this invention is to provide such a device as herein mentioned wherein servicing of bearings and the like is simplified;

Another object of this invention is to provide such a device as herein described wherein the roll up mechanism can be locked by an appropriate locking pin or other means to prevent inadvertent movements.

The foregoing and other objects and advantages will become apparent to those skilled in the art upon reading the description of a preferred embodiment which follows in conjunction with a review of the appended drawings.

BRIEF DESCRIPTION OF THE DRAWINGS

FIG. 1 is a perspective of a truck and trailer utilizing the method and apparatus of this invention;

FIG. 2 is a side elevation of FIG. 1;

FIG. 3 is a fragmentary perspective view of the tarpaulin cover and reel assembly relating to the dumptruck;

FIG. 3A is an alternative ratchet arrangement to lock the apparatus of this invention in place;

FIG. 3B is another alternate embodiment of a device to hold the tarpaulin of this apparatus in place;

FIG. 4 is an exploded perspective of the crank end of reel assembly of FIG. 3;

FIG. 5 is a sectional view, generally along line 5—5 of FIG. 3;

FIG. 6 is a fragmentary perspective of the tarpaulin cover and reel assembly utilized on a trailer;

FIG. 7 is a schematic sectional view on 7—7 of FIG. 10 in which both a dump truck and its trailer are nested together during a phase of the trailer load dumping operation; FIGS. 8 through 11 show side elevational views in partially schematic form of the procedures employed in dumping both the truck and trailer loads of the invention while utilizing the covers and reels of the invention; and FIG. 12 schematically shows a side elevation of the procedures employed in covering the truck and trailer loads as practiced in prior art.

DESCRIPTION OF A PREFERRED EMBODIMENT

The perspective view of FIG. 1 illustrates a typical dump truck and trailer utilizing the present invention. Reference letter "A" generally designates the dump truck with its load and cover assembly; "B" refers to the trailer and its cover assembly over a load; and "C" is a reference to the connection for towing the trailer.

The cab 10, load bed 12 and tailgate assembly 14 portray a typical dump truck assembly of the type generally used in present day hauling. The tailgate is pivotally mounted to the truck bed at 16 and is actuated by well known art to be lifted by means of a hydraulic or pneumatic cylinder actuator shown in FIG. 2.

In an illustration shown later in this application and description, a conventional multiple actuating cylinder operates the dumping procedure, as shown in FIGS. 9 and 11.

Referring to FIGS. 1 through 5, and specifically to the perspectives of FIGS. 3 and 4, I have shown in general terms at 30 the reel and cover components of the invention. The cover sheet 32, made from a reinforced sheet material that is resistant to all types of weather conditions, and to corrosive materials that are being covered, is shown being pulled away from a supply roll 34. The sheet material is affixed at its rolled up end to a shaft member 36 in a conventional manner familiar to those skilled in the art.

At the other end of the sheet material proximate its edge, a crossbar 38 is shown. The crossbar extends a distance beyond each side edge of the sheet so as to ride upon the side rails of the dump truck bed to prevent the tarpaulin sheet from falling into the inner portion of the truck bed and becoming difficult to handle and retrieve.

The reel take-up assembly, generally referred to by the numeral 40, is shown in FIGS. 3 through 5, as comprising a pair of roller bearings 42 and 44 which are supported and mounted in brackets 46 and 48. The brackets, mounted by weldment or other conventional fastening means are secured to the side rails of the bed of the dump truck at the end closest to the cab as shown in FIGS. 1 and 2.

Each bracket is constructed with a cradle for receiving the bearings. These cradles 50 and 52 are aligned with slots 51 and 53 provided in brackets 46 and 48 so that the shaft 36 can be placed, with its pair of bearings, onto the brackets allowing the cover roll to be rotated along with its shaft. The bearing cradle 50 is formed integrally with the bracket by weldment, or the like. Bearing retainer lock pins 54 and 56 can be passed through holes 58 to keep the bearings from being lifted out of their cradles. Securement chains 60 and 62 are provided to keep the retainer pins from being lost during use. The pins are of the well known type that have spring-urged ball detents that keep the pin from backing up out of the holes 58 during their bearing retaining position.

In order to return the tarpaulin cover 32 from its fully extended position for covering the dump truck's load, I have affixed a crank handle 64 to the end of the shaft 36 at the end closest to the driver's door in the cab. This provides easy access to the operator of the dump truck for servicing the reel assembly.

When the roll of covering material has been fully retracted, a lock pin 66, similar to the lock pins 54 and 56, is provided for insertion through a hole provided in shaft 36. A full insertion of the pin 66 passes it through hole 74 in a plate 72. This action secures the cover roll and shaft from unwinding during non-use. The shelf plate 74 is affixed to the side plate 46 by weldment, or the like. A chain 58 is provided to keep the lock pin 66 from being lost during handling.

FIG. 3A is an alternate embodiment of the mechanism for retrieving the covering tarpaulin on to its reel shaft.

The mechanism, at 440 comprises a bearing member 442 retained in cradle 450 of bracket member 446. Slot 451 is provided to allow the take-up shaft to pass therethrough. Retainer pin 454 passing through holes 458 maintains the bearing in place during use. The pin 454 is provided with a chain 460 so as not to be lost.

Crank arm 464 is affixed to the take-up shaft and a ratchet wheel member 466 is shown secured to the shaft. This is by screw 467. A ratchet pawl 468 is pivotally mounted toa lug 472. A spring member 474 is attached along with lug 472 to a shelf projection 476. This shelf is attached to the bracket member 446. The operator of the equipment can release the pawl 468 from contact with a piece of ratchet wheel 466 by moving the handle extension 469 as desired. After the cover has been placed over the load the pawl can be once again engaged with the ratchet wheel and will hold the cover tightly against movement.

It is clear that certain other types of locking arrangements might be utilized.

At the other end of the tarpaulin 32 which is away from the rolled portion I have provided a means for securing the tarpaulin onto the load during transport. The edge of the tarpaulin has provisions for a resilient securing cord 78, such as a bungee cord, to be placed. The cord 78 is provided with a loop 80 located at a point between the edges of the cover sheet. This loop 80 is provided for engagement by a hook 82 affixed to the end of a long pole 84.

This pole is an essential part of the procedure used in the labor saving and safe operation of covering both the truck and trailer loads. As can well be seen in FIGS. 1 and 2, the pole with its hook end can be transported readily along with the truck and trailer to the side of unloading by securing it in a fashion that it can be removed readily with ready to be used. The connection "C" is shown to house the pole in FIGS. 1 and 2, but it is obvious that it can be secured alongside the truck load body if a trailer is not used.

The operator, usually the truck driver, need only stand on the rear end of the truck and reach with the pole and hook to the roll end of the tarpaulin and hook the loop at the end of the cover to pull it over the bed of the dump truck and the load prior to covering the load. Then the operator need only to secure the flexible cord 78 to the tailgate as will be shown later in this application.

It can be seen that the cover and reel assembly can be removed readily from the truck body if it is not required during certain hauling conditions. It can be stored, or taken off for repair or replacement of the sheet material, as desired.

Turning to the trailer cover and reel assembly of FIG. 6 it can readily be seen that the various components for the cover are almost identical to the cover described for the dump truck.

Reference numerals in this case are identical to those used before with the exception that a "1" is inserted before each one.

One difference in the showing of FIG. 6 is that the tailgate assembly 211 is not hydraulically actuated and freely falls when the load is tipped for dumping.

Another variation of construction is shown that the brackets 146 and 148 are affixed to the tailgate in the manner shown. Extensions 147 and 149 are provided with notches 151 and 153 for the purpose of holding the ends of the end rod 138 when the roll of sheet material is fully brought back in its rolled up condition. These extensions are formed integrally with the brackets 146 and 148. The crank end of the shaft 136 is located at the right rear end of the trailer, in this case.

Referring specifically to FIGS. 1, 2 and 7, it can be seen that the trailer is of a construction which comprises a cargo bed 200 having roller means 202 for movement on track 204. Outwardly extending pins 206 at the rear of the trailer bed interlock with hook members 208 on the dump truck bed when the trailer bed is moved into a mating relationship shown in FIG. 10. This is a process well known in the art.

Retaining hooks are provided on the truck tailgate at 190 and on the forward wall of the trailer at 192. These are used to hook the resilient cords 78 and 178 during the pulling and retaining of the covers 30 and 130 over the loads.

FIG. 3B illustrates an alternate method of holding covers 32 and 132 to the tailgates 14 and 210 of the truck trailer equipment. A pair of U shaped hook members 500 (only one being shown) are affixed to the tailgate in the manner shown and the end bar members 38 and 138 can be retained in the hook members prior to the tensioning of the cover onto the pick up reels. This embodiment aids in keeping the covers from billowing during windy conditions and during movement of the vehicle along roadways.

The simple operation of covering and uncovering of the loaded truck and trailer is as follows:

The operator unhooks the pole 84 with hook 86 and reaches over the load from the rear of the truck and from the front of the trailer to hook the loops of each cover. When the operator covers the load, he secures the cords to the respective hooks on the tailgate and the trailer. First the lock pins are removed from the respective roll shafts at the points of the crank arms. The operator rolls up and tensions the covers. The lock pins are inserted to keep the covers taut over the respective loads.

To unload the truck after unhooking the trailer, the operator releases the cover and cranks up the sheet, inserts the lock pin, and proceeds to actuate the dumping process as seen in FIG. 9. Then the trailer is moved into the empty cargo bin of the truck, locked in place and then dumped as in FIG. 11. The trailer cover can be rolled up, or just allowed to remain while this final load is dumped. The trailer is then reattached.

In prior art methods (FIG. 12) one or two persons have to climb about on both the truck and trailer to accomplish the tasks set forth above. Persons "D" and "E" are shown in this figure handling covers 300 and 302 in a time-consuming and unsafe manner. The present invention eliminates such practices.

The cover and reel assemblies are not necessarily limited to dump trucks or trailers, and can be applied to flatbed, stake, and pickup trucks, as well. Loose loads, such as gravel, sand and fertilizer, dangerous materials such as hot asphalt, can be easily and safely retained by the cover and reel assemblies of the invention.

The loading of materials onto trucks and trailers is also made easier by the cover structure described in this invention because the side walls of the vehicle or trailer need not be of an exorbitant height to accommodate heaping loads.

While the embodiments described and illustrated are fully capable of achieving the objects and advantages desired, it is to be understood that these embodiments are for purposes of illustration only and not for purposes of limitation.

I claim:

1. The method of covering a load of material in an open bed truck or trailer comprising: mounting a first bearing adjacent a first side of a top of a first end of an open bed truck or trailer; mounting a second bearing adjacent a second side of said top of said first end of the open bed truck or trailer; mounting an axle having handle means rotatably movable within said bearings; affixing locking means to said axle in such manner that said axle can be locked against rotation if desired; fastening a first end of a tarpaulin having a first end and a second end with a loop suitable to be engaged by a hook on a telescoping pole afixed to said second end to said axle; affixing an elongated member having a first and second end to a second end of said tarpaulin in such manner that said elongated member extends a distance from each side of said second end of said tarpaulin; resting the first and second ends of said elongated member upon a first and second side of said open bed truck; winding said tarpaulin upon said axle by rotating said axle by use of said handle; locking said axle against movement by activating said locking means; filling said open truck or trailer bed with a load of material; engaging the loop on second end of said tarpaulin with a hook mounted upon a telescoping pole extending from a second end of said open bed truck or trailer; releasing said axle locking means; pulling said tarpaulin with said pole until the second end of said tarpaulin reaches said second end of said open bed; fastening said second end of said tarpaulin to said second end of said open bed; and activating said axle locking means to prevent movement thereof.

2. The apparatus to cover a load in an open bed truck or trailer having a bottom, a first end wall extending a distance vertically from said bottom, a second end wall extending a distance vertically from said bottom and in the same direction as said first end wall, a first side extending a distance from said bottom, a second side connected and fastened to said bottom and extending vertically a distance in the same direction as said first side, means connecting said bottom, first end, second end, first side and second side so as to form a truck bed container open at its top; a first bearing mounted adjacent the connection of said first side and first end wall; a second bearing mounted adjacent the connection of said second side and said first end wall; an axle mounted within the first and second bearings; a handle fastened to said axle adjacent a first end thereof; a means to releaseably lock said axle against rotation; a first end of a tarpaulin mounted upon said axle; a second end of said tarpaulin mounted upon an elongated member having an extension upon each side of the second end of said tarpaulin, said extensions resting upon the upper edge of the two sides of said open truck bed; a loop of elastic material fastened to said second end of said tarpaulin; a hook suitable to engage said elastic loop mounted upon a telescoping pole; and means upon said second end of said open bed to engage said second end of said tarpaulin.

* * * * *